May 4, 1948. G. A. LYON 2,440,804
WHEEL STRUCTURE
Filed March 12, 1943 2 Sheets-Sheet 1
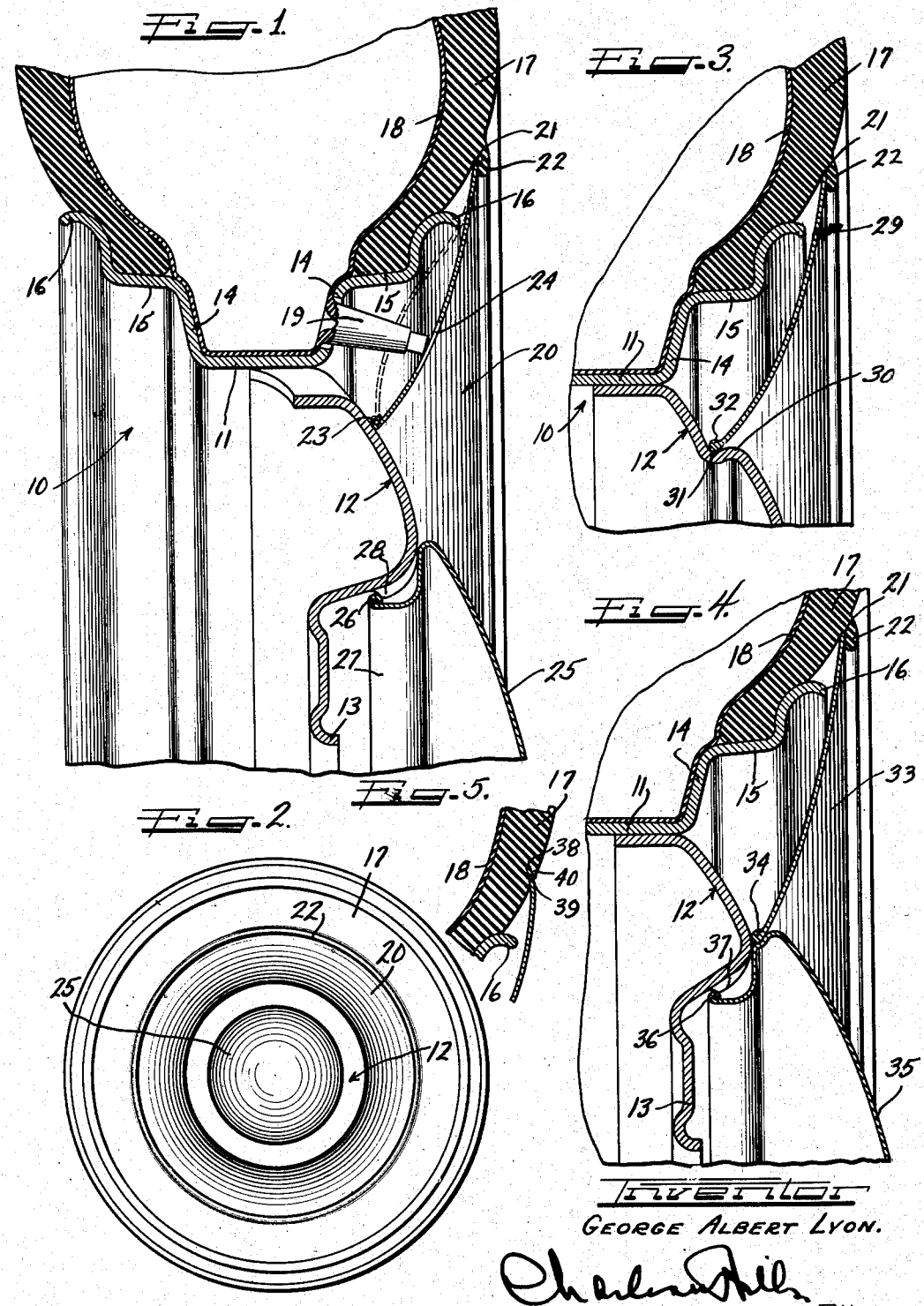
Inventor
GEORGE ALBERT LYON.

May 4, 1948. G. A. LYON 2,440,804
WHEEL STRUCTURE
Filed March 12, 1943 2 Sheets-Sheet 2
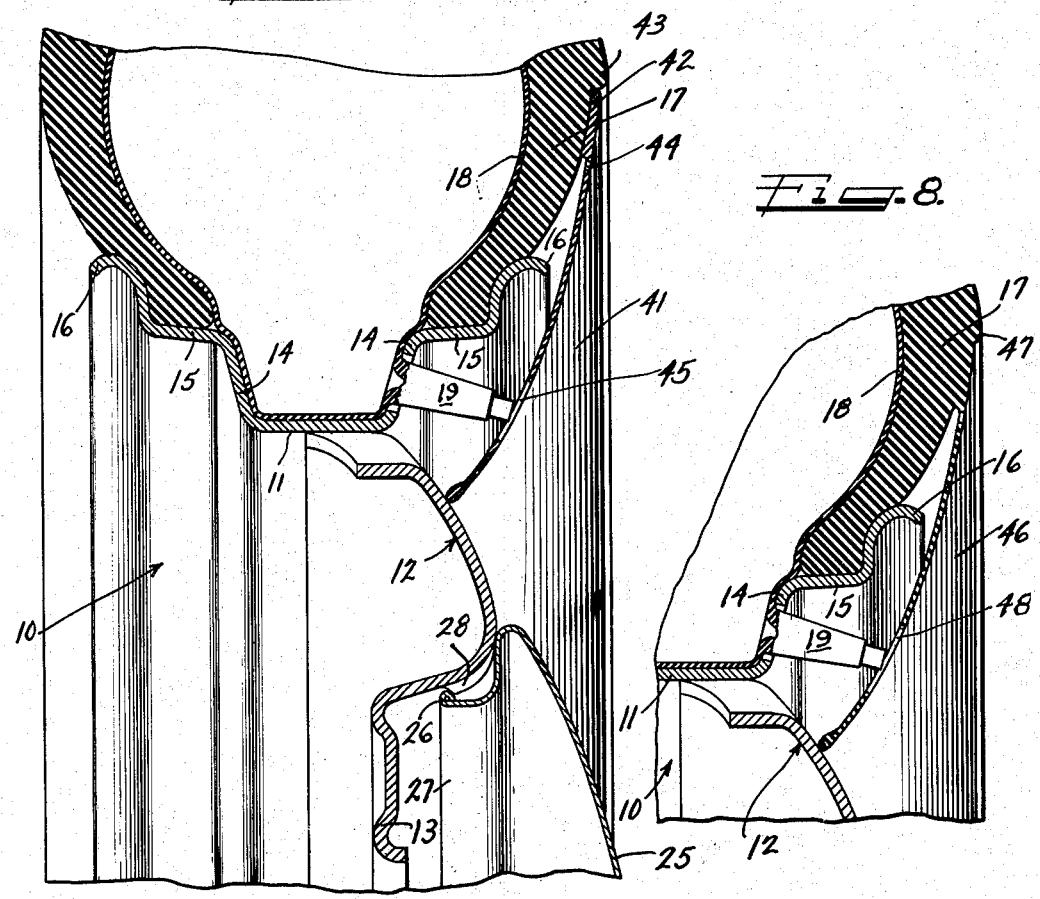
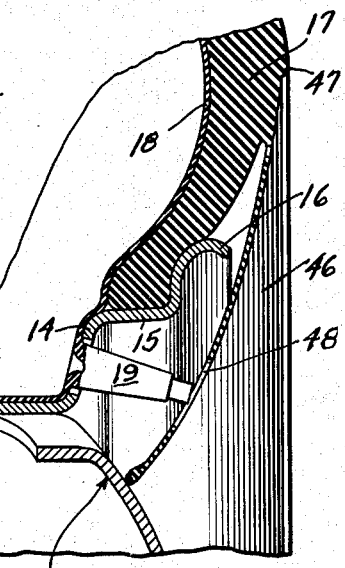
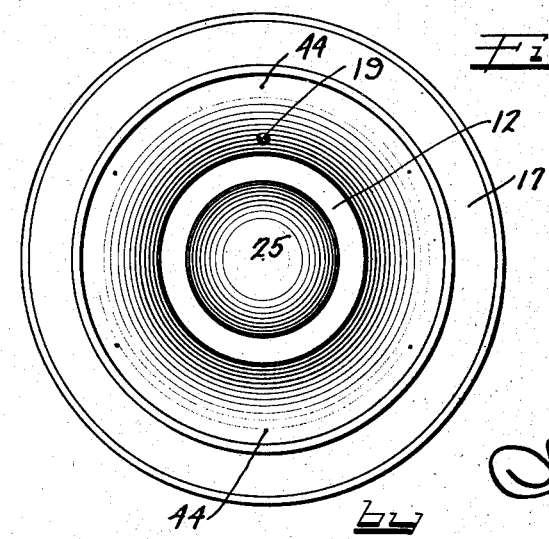
Inventor
GEORGE ALBERT LYON.

Patented May 4, 1948

2,440,804

UNITED STATES PATENT OFFICE 2,440,804

WHEEL STRUCTURE

George Albert Lyon, Allenhurst, N. J.

Application March 12, 1943, Serial No. 478,874

5 Claims. (Cl. 301—37)

This invention relates to an improved wheel trim structure and is directed more particularly to a novel construction for retaining a wheel trim assembly upon the wheel structure.

An important object of the invention is to provide a wheel cover construction which is so arranged that the tire rim and the valve stem of the tire in the rim is effectively concealed and so that the cover member may be so cross-sectionally configurated as to constitute in effect a continuation of the side wall of a tire in the rim when it is disposed over the outer side of the wheel structure to give the appearance of being a part of the tire.

Still another object of the invention is to provide an improved and novel arrangement for securing a cover member to a wheel structure having a tire therein.

Another object of the invention is to provide an improved wheel cover member formed from synthetic plastic, natural or synthetic rubber or any other rubber-like material so that it may be locally resiliently flexed for the purpose of attaching it to the wheel structure and for the further purpose of rendering the rear side thereof accessible to provide for servicing of a tire valve stem, wheel weights or other appurtenances over which it is disposed in concealing relationship.

Still another object of the invention is to provide a novel cover member for an automobile wheel or the like which is so arranged as to be retained upon the wheel structure in detachable relationship thereto by virtue of its novel engagement with the side wall of a tire in the wheel structure.

Still a further object of the invention is to provide for a wheel structure a novel cover member of locally flexible, resilient rubber-like material which effectively conceals the outer part of the tire rim of a wheel structure and appurtenances attached thereto and is of such radially cross-sectional configuration as to give the appearance of a white side wall of the tire when it is disposed over the outer side of the wheel structure and is white in appearance.

In accordance with the general features of my invention there is provided herein a wheel structure including a multiflange drop center tire rim and a tire therein having a circular groove formed upon the outer side wall thereof and a part radially inwardly of the axially widest portion of the tire, the groove being arranged to receive the outer peripheral edge of a resiliently locally flexible cover member, the radially inner portion of which is constructed to extend radially inwardly over the outer part of the tire rim and the appurtenances associated therewith to conceal the same and to constitute in effect a continuation of the side wall to give the appearance of a massive tire mounted upon the wheel structure.

In accordance with other features of the invention and as shown in one form thereof, there is provided herein an annular cover member secured to the side wall of the tire as set forth above and having its inner periphery arranged for sliding engagement against an outer surface of the wheel structure thereby to accommodate lateral flexure of the tire and flexure of the wheel cover therewith.

Still another object of the invention is to provide an improved wheel cover which is retained on a wheel structure by engagement with attaching means on the outer side wall of a tire in the wheel structure, said cover being constructed and arranged to flex during rotation of the wheel with a load thereon to accommodate lateral flexure or expansion of the tire when a load is impressed thereon.

It is a further object of my invention to provide a novel wheel cover for a wheel structure with novel attaching means whereby positive detachable engagement is provided between the tire proper and the cover member associated therewith.

Still another object of the invention is to provide an improved wheel cover which is retained on a wheel structure by engagement with the outer side of the tire in the wheel structure, said cover being secured to the side wall of the tire by a suitable cement or the like.

Still another object of the invention is to provide an improved wheel cover which is retained on the wheel structure solely by virtue of its association with the side wall of a tire in the tire rim of the wheel structure with which it is associated.

It is a further object of the invention to provide an improved vehicle tire assembly in which there is provided a radially inwardly extending lip of such cross-sectional configuration and magnitude that it constitutes in effect a continuation of the side wall of the tire and conceals the junction between the tire and a tire rim in which it is disposed when mounted on a wheel structure.

A more specific object of the invention is to provide in a wheel assembly which includes a wheel structure having a tire rim, a tire having a circular groove formed in the side wall thereof for receiving a portion of the cover member extending thereof, in detachable relationship.

Other objects and advantages of my invention will become apparent from the following description and accompanying drawings in which Figure 1 is a fragmentary cross-sectional view of a wheel structure embodying my invention;

Figure 2 is a side elevation of a wheel structure constructed in accordance with Figure 1;

Figure 3 is an enlarged fragmentary cross-sectional view of a wheel structure embodying a modified form of my invention;

Figure 4 is a fragmentary cross-sectional view of a wheel structure embodying a further modified form of my invention;

Figure 5 is a fragmentary cross-sectional view showing still another modified form of my invention;

Figure 6 is a fragmentary cross-sectional view of a wheel structure embodying a still further modified form of my invention;

Figure 7 is a side elevation of a wheel structure constructed in accordance with Figure 6; and Figure 8 is a fragmentary cross-sectional view of still another modified form of my invention.

It will be understood that the embodiments disclosed herein are for illustrative purposes only and may be changed or modified without departing from the spirit and scope of the invention as set forth in the appended claims.

As shown on the drawings the reference character 10 designates generally a multiflange, drop center type tire rim which is connected as by riveting or welding or the like through the base flange 11 to the central body part or spider 12 which includes a central bolt on flange 13. The drop center rim 10 is further provided with opposite side flanges 14, opposite intermediate flanges 15 and opposite edge portions 16. A tire 17 having an inner tube 18 and a valve stem 19 is mounted upon the rim, one of the side walls 14 having an orifice through which the valve 19 may project.

An ornamental cover member, which may be in disk form to cover the entire outer side of the wheel structure but which in the present instance, for purposes of illustration, is shown as an annulus 20, is provided with such a cross-sectional configuration and curvature that it presents in effect a continuation of the side wall of the tire 17 when disposed in overlying relationship to the outer side of the tire rim 10. The cover member 20 is of such radial depth that it extends from a portion of the body part 12, radially outwardly over the tire rim 10 and beyond the edge portion 16 thereof to the side wall of the tire 17 at a part thereof radially inward relative to the widest part of the bulge therein.

With such a construction it will be seen that the cover member 20 instead of presenting a sharp axially inward curve from the outer periphery thereof, presents a gradual curve which gives the effect of a continuation of the side wall of the tire and thus the appearance of being a part thereof whereby, if it is colored white, it gives the appearance of being a white side wall of the tire. Furthermore the cover member 20, since it extends radially outwardly beyond the edge portions 16 of the tire rim, effectively conceals the junction between the tire rim and the tire as well as the outer portion of the tire rim and the appurtenances associated therewith such as the valve stem 19.

As indicated previously the cover member 20 is preferably constructed from a synthetic plastic, rubber, synthetic or natural, or from some other substance which has rubber-like qualities in that it may be locally deformed for the purpose of providing access to the rear side of the cover member and yet will return to normal position when the flexing or distorting pressure is released therefrom.

To the end that the cover member may be securely attached to the wheel structure and to the tire to effectively provide the aforementioned representation of the continuation of the side wall of a tire so that the outer edge thereof may be readily attached to or detached from the wheel assembly, there is provided herein a novel tire construction which includes a circular groove or recess or a plurality of grooves or recesses on the side wall thereof for detachably receiving the outer edge of the cover member.

As shown in Figure 1, the tire 17 is provided with a groove 21 which is formed by a radially inwardly extending, integral lip 22 on the side wall of the tire. This groove 21 and the lip 22 which defines the outer side thereof may be either circular and continuous entirely around the side wall of the tire or, if desired, may be composed of a plurality of spaced lips and spaced respective grooves. As will also be seen from Figure 1 the lip 22 is formed on the part of the side wall radially inwardly removed from the widest part thereof whereby the lip is effectively protected from damage by rubbing up against curbs or the like since the widest part of the tire will first engage the obstruction before the lip 22 engages the same.

As will be evident from Figure 1 the lip 22 is readily deflectable or bendable into an axially outward position whereby the outer peripheral edge of the cover member 20 may be progressively slipped thereunder and into the groove 21 without the aid of tools.

As shown in Figures 1 and 2 the cover member 20 is effectively held on the wheel structure solely by virtue of the engagement of the outer peripheral edge thereof in the groove 21 on the tire since the inner peripheral edge thereof, which is reinforced by a turned back lip 23 which may be cemented in position, is merely disposed in slidable abutting relationship with the outer surface of the spider 12 of the wheel structure.

After the cover member 20 has been installed upon the wheel structure by attachment to the tire as described above, the valve stem 19, which it effectively conceals, is available for connection with an air hose by means of an orifice 24 which is formed in the cover member 20 and disposed in registry with the valve stem. To connect the air hose to the stem it is merely necessary to urge the resiliently deflectable cover member 20 into a position shown in dotted lines in Figure 1 whereupon the hose connection may be made. Upon release of the hose the cover member 20 will spring back into normal outwardly bowed condition by virtue of its own rubber-like resiliency.

As indicated previously the inner peripheral edge 23 of the cover member engages the spider 12 in unattached abutting relationship and thus in the event of lateral deflection of the tire 17 and resulting flexure of the cover member 20, the inner peripheral edge thereof is free to move over the spider 12 to accommodate temporary, local flexation of the cover member.

In the construction of Figure 1 the central portion of the spider may if desired be covered by a central hub cap member 25, the peripheral edge of which is formed into a bead 26 which comprises the terminal edge of an axially inwardly extending snap-on flange 27.

Many different expedients may be utilized for attaching the central hub cap portion 25, however, in the present instance, the body or spider part 12 of the wheel structure is so cross-sectionally configurated as to provide a plurality of radially inwardly extending bumps 28 over which the bead 26 of the hub cap portion 25 may be pressed and behind which they are retained in snap-on pry-off relationship.

In the construction shown in Figure 3 the mode of attachment of the cover member 29 is similar to that described in connection with Figure 1 insofar as the outer peripheral edge thereof is concerned, however, in this construction the spider 12 is so cross-sectionally configurated as to provide a radially outwardly extending rib 30 and a radially outwardly extending groove 31 into which the enlarged or beaded inner peripheral edge 32 of the cover member 29 may be locked by urging it axially inwardly over the rib 30.

In this construction radially inward movement of the groove 21 as a result of lateral outward movement of the tire under pressure conditions is accommodated by inherent flexing of the cover member 29, this flexing causing axial outward movement of the body of the cover member as pressure is applied radially inwardly and against the beaded portion 32 which is locked in the groove 31 of the spider.

In the construction shown in Figure 4 the cover member 33 is retained on the wheel structure at its outer peripheral edge in a manner similar to that described in connection with the previous forms of my invention. In this construction the radially inner beaded edge 34 of the cover member 33 is maintained in attached relationship to the wheel structure by virtue of the engagement of the hub cap portion 35 which, when attached to the wheel structure in the manner described in connection with the cap 25 shown in Figure 1 or by any other suitable expedient, engages the axially outer surface of the inner peripheral edge of the cover member 33 to urge it against the spider 12. In this construction the locally resiliently flexible cover member 33 may be distorted into an inwardly bowed position such as that shown in the dotted lines in Figure 1 in order to remove the bead 34 radially outwardly of the spider member at the distorted portion whereby a pry-off tool may be inserted behind the radially outer extremity of the hub cap portion 35 to pry the peripheral bead 36 thereof axially outwardly over the radially inwardly extending hub 37 formed upon the spider 12. Thus it will be seen that the hub cap portion 35 may be removed to expose the wheel attaching bolts without necessitating the removal of the cover member 33 from the tire.

In the construction shown in Figure 5 there is provided a modified form of tire for receiving the outer peripheral edge of the cover member. In this construction the lip 22 is dispensed with and instead the tire is molded merely with a radially inwardly extending slot 38 into which the outer peripheral edge of the cover member 39 may be inserted. It will be understood that the portion 40 of the tire 17 which extends radially inwardly and provides for the outer wall of the groove 38 may be drawn outwardly by finger pressure if desired in order to facilitate the insertion of the outer edge of the cover member into the groove. In this construction it will be seen that the cover member 39 gives the appearance of being an integral part of the tire since it merely emerges therefrom and thus constitutes in effect the continuation of the side wall of the tire to give the appearance of being a part thereof.

In the construction shown in Figures 6 and 7 there is provided a still further modified form of tire for receiving the outer peripheral edge of the cover member 41. In this construction the side wall of the tire 17 is recessed axially inwardly at the radial inward portion thereof from substantially the medial plane, this recess being arranged to receive the outer peripheral margin 42 of the cover member 41 which is enlarged as shown in Figure 6. The enlarged margin 42 serves to strengthen the outer peripheral portion of the cover member 41 and is cemented or otherwise suitably secured to the outer face of the side wall of the tire whereby it is retained in the position shown in Figure 6.

As stated previously, the side wall of the tire is suitably recessed to receive the enlarged or reinforced margin 42 of the cover member 41 and as a result thereof an annular protective bead 43 is formed on the side wall of the tire at substantially the medial plane thereof. This bead 43 serves as a radial abutment for the cover member 41 during lateral expansion of the side wall of the tire under load bearing conditions and furthermore, since it extends axially outwardly of the radially outer margin of the cover member it is served to protect the same from damage by abrasion against a curb or other obstruction against which the vehicle might be driven.

To the end that moisture and dirt which might collect behind the cover member, apertures 44 are provided therein at the radially outer extremity of the chamber formed by the cover member. It will be understood that the moisture or dirt so collected will be emitted by virtue of centrifugal forces developed during rotation of the wheel assembly in use.

When the tire 17 as constructed in accordance with the disclosure of Figure 6 is mounted upon the tire rim 10, it will be seen that the cover member 41 completely conceals the outer side of the tire rim and occupies a plane axially outwardly of the extreme end of the tire valve 19. Consequently the cover member 41 may be provided with an aperture 45 through which the valve may be rendered accessible in a manner described in connection with Figure 1 or if the cover member 41 is sufficiently elastic as when made from rubber, then the radially inner peripheral edge thereof may be flexed axially outwardly and radially outwardly to render the tire valve accessible. Likewise in the use of a pry-off tool for removing the outer bead of the tire 17 the cover member 41 is preferably flexible locally in a manner above described so that the tool may be inserted over the edge portion 16 and beneath the tire bead disposed therein.

In the construction shown in Figure 8 the assembly is similar to that described in connection with Figure 6 except that the cover member 46 is molded integrally with the tire 17. In this construction also the tire is formed with an axially outwardly extending bead 47 at substantially the medial plane thereof, this bead also providing protection for the cover member 46 when the vehicle is driven against a curb or other obstruction. In this form of the invention the cover member 46 may also be provided with an aperture 48 through which the valve 19 is rendered accessible or preferably the valve may be exposed by manipulation of the inner peripheral edge of the cover member whereby the latter is flexed radially and axially outwardly.

From the foregoing it will be seen that I have provided herein a novel tire cover arrangement wherein the tire cover effectively conceals the outer side of the tire rim and the appurtenances associated therewith, together with the junction between the tire rim and the tire to the end that the tire cover constitutes in effect a continuation of the side wall of the tire and cooperates therewith in a novel manner whereby the cover may be maintained in its operative position solely by engagement with the side wall of the tire. There is also provided herein a tire cover which engages the side wall of the tire that is so constructed and arranged as to compensate for flexation of the tire during operation under load bearing conditions by flexing therewith locally as a load is imparted to and released from the tire.

From the foregoing it will be seen that preferably the diameter of the groove in the tire should be slightly less than that of the outer periphery of the cover member in order that the tire, when the cover member is assembled in the recess therein, will exert a substantially radially inward gripping action on the cover to more securely retain the same in its assembled position.

As indicated previously the cover member and particularly the radially outer part thereof is constructed from synthetic plastic or from rubber, either natural or synthetic, or from any other material which possesses rubber-like characteristics whereby it may be flexed locally to afford access to the rear side thereof. It is to be understood therefore that the use of the term "rubber-like" in the appended claims is intended to connote a cover member constructed from any material which affords the flexible characteristics heretofore mentioned.

What I claim is:

1. In a wheel structure including a wheel having a central load supporting member, a multi-flanged tire rim thereon and a tire carried by the rim, said rim having a valve stem extending from one of the outer side flanges thereof and said tire having a shouldered portion on an outer side wall thereof, a circular resiliently deflectable plastic wheel trim dished axially inward so as to extend radially and axially inwardly from the tire over exposed outer side flanges of the tire rim and provided with a valve stem opening, the portion of said trim about said opening being deflectable to render the valve stem accessible without necessitating the removal of said trim from the wheel, said deflectable portion upon release returning back of its own accord to its original contour, and said trim having an outer edge engaged with the shouldered portion on the outer side wall of the tire.

2. In a wheel structure including a wheel body member, a multi-flanged tire rim thereon and a tire carried by the rim and provided with a shouldered portion on an outer side wall thereof, a cover for an outer side of the flanged rim including a radially outer resiliently flexible portion made of a form-sustaining plastic, which is of such depth as to substantially conceal the exposed side flanges of the rim, and having an outer edge retainingly engaged with said shouldered portion of the tire and also having a radially inner part bearing on the wheel body member axially inwardly of the engagement with the tire whereby said cover, in use, will appear to be a continuation of the curved side wall of the tire.

3. The wheel structure of claim 2 further characterized by the engagement of the outer edge of the cover with said shouldered tire portion constituting the sole means for retaining the cover on the wheel.

4. In a wheel structure including a wheel body member, a multi-flanged tire rim thereon and a tire carried by the rim and provided with a shouldered portion on an outer curved side wall thereof, a cover for an outer side of the flanged rim, retainingly engaged with said shouldered portion and including an annular portion made of form-sustaining plastic which is resiliently yieldable without permanent distortion and which is of such depth as to substantially conceal the exposed outer side flanges of the rim, said annular cover portion being dished axially toward the wheel so as to extend radially and axially inwardly from said shouldered portion to constitute a symmetric radially inner continuation of the curved side wall of the tire thereby giving the appearance of the tire extending radially inwardly beyond the side flanges of the rim to a point in close proximity to the wheel body member.

5. The structure of claim 4 further characterized by the annular cover portion having a radially inner edge bottomed on the wheel body member.

GEORGE ALBERT LYON

REFERENCES CITED

The following references are of record in the file of this patent:

UNITED STATES PATENTS

| Number | Name | Date |
|---|---|---|
| 628,562 | Thornton | July 11, 1899 |
| 1,291,676 | Gammeter | Jan. 14, 1919 |
| 1,316,333 | Roussotte | Sept. 16, 1919 |
| 1,503,397 | Wacker | July 29, 1924 |
| 1,662,599 | Brown | Mar. 13, 1928 |

FOREIGN PATENTS

| Number | Country | Date |
|---|---|---|
| 130,926 | Australia | Dec. 27, 1932 |